United States Patent [19]

Paar

[11] Patent Number: 4,757,113
[45] Date of Patent: Jul. 12, 1988

[54] CATIONIC WATER-DILUTABLE BINDERS AND PROCESS FOR THEIR PRODUCTION

[75] Inventor: Willibald Paar, Graz, Austria

[73] Assignee: Vianova Kunstharz, A. G., Werndorf, Austria

[21] Appl. No.: 54,733

[22] Filed: May 27, 1987

[30] Foreign Application Priority Data

May 27, 1986 [AT] Austria .................................. 1404/86

[51] Int. Cl.[4] ............................................. C08G 18/80
[52] U.S. Cl. ....................................... 525/124; 528/45
[58] Field of Search ........................... 528/45; 525/124

[56] References Cited

U.S. PATENT DOCUMENTS 4,101,486 7/1978 Bosso et al. ............................ 528/45

*Primary Examiner*—Maurice J. Welsh
*Attorney, Agent, or Firm*—A. W. Breiner

[57] ABSTRACT

Cationic water-dilutable binders which are particularly useful in cathodically depositable coating compositions, which are crosslinked with polyisocyanate compounds, which are partially or totally blocked with enamines of C-H-active dicarbonyl compounds and a process for their preparation are described. Paints formulated on the basis of the described binders can be cured at temperatures at from 120° C. to provide resistant films.

25 Claims, No Drawings

CATIONIC WATER-DILUTABLE BINDERS AND PROCESS FOR THEIR PRODUCTION

FIELD OF INVENTION

This invention is directed to cationic water-dilutable binders particularly suitable for use in cathodically depositable coating compositions which are crosslinked with polyisocyanate compounds partially or totally blocked with enamines of C-H-active dicarbonyl compounds, and to a process for producing the binders.

BACKGROUND OF INVENTION

Crosslinking through transurethanization of cationic water-dilutable paint binders including for use in the formulation of cathodically depositable paints (CED-paints) is disclosed in the art. Among the first pertinent references making such disclosure are DE-OS Nos. 20 20 905, 22 52 536, 20 57 799, U.S. Pat. No. 3,799,854, and an article in *Off. Digest*, Feb. 1960, pp. 213–221. In the transurethanization, blocked or partially blocked polyisocyanate compounds are used. One of the main disadvantages of such systems is the high deblocking temperature which is necessary in application. Blocking agents with a low deblocking temperature, such as phenol, which are used in solvent-dissolved systems as described in U.S. Pat. No. 2,995,531, are not stable in an aqueous medium and thus cannot be used in the aqueous systems contemplated by the present invention. Other blocking agents having a low deblocking temperature, such as the N,N-dialkylglycolamides described in EP-A1-0 118 743, will sublimate in many instances and either remain in the paint films or lead to soilage of the stoving installations.

In an application filed in Austria, not yet published, diisocyanate compounds blocked with NH-functional enamines obtained at low temperatures from C-H-active dicarbonyl compounds and primary amines are disclosed. On deblocking, only low volatile decomposition products result.

GENERAL DESCRIPTION OF INVENTION

It has now been found that enamine-blocking of polyisocyanates can also be accomplished in aqueous cationic systems without the normal disadvantages of such systems being encountered. The ability to use the enamine-blocked polyisocyanates in aqueous cationic systems have the special advantage of permitting the formulation of CED-paints for use at low stoving temperatures.

Accordingly, the present invention is directed to cationic water-dilutable binders based on a resin component which carries hydroxy groups and/or primary and/or secondary amino groups and a blocked polyisocyanate compound as a crosslinking component wherein the blocked polyisocyanate is partially or completely blocked with NH-functional enamines obtained from C-H-active dicarbonyl compounds and ammonia and/or primary amines. The resin component can be a polycondensation resin product, addition polymers based on ethylenically unsaturated monomers, or other resinous polymers.

The invention is further directed to a process for producing such binders as above described and to the use of the binders produced in cationic aqueous paint formulations for the CED-process.

It is known to produce NH-functional enamines from C-H-active dicarbonyl compounds, such as acetoacetate or acetyl-acetone, through reaction with primary amines or ammonia, with the separation of water according to the reaction.

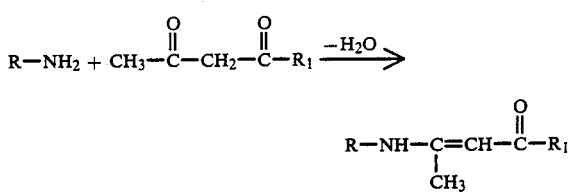

wherein R is H— or an alkyl radical and $R_1$ is $-OC_2H_5$ or $-CH_3$. See, for example, "Organikum," *Organisch-chemisches Grundpraktikum*, 2., Nachdruck of 15th Edition, Berlin 1981; VEB Deutscher Verlag der Wissenschaften, page 480. The enamines thus obtained surprisingly react at temperatures of from 20° to 30° C. with a polyisocyanate, in a straight forward reaction, to produce semi-blocked diisocyanates having a low deblocking temperature. The normal blocking agents for a polyisocyanate cannot be deblocked at a low temperature. With the conventionally used tin-catalysts with the crosslinking system of the present invention, stoving temperatures of 120° to 130° C. are sufficient. Moreover, the blocked system is stable in an aqueous medium.

Suitable C-H-active dicarbonyl compounds include, in addition to the above-mentioned acetyl-acetone and acetoacetates, compounds such as the N-substituted acetoacetate amides, and the like.

In the formation of the enamines, the dicarbonyl compounds are reacted at from about 50° to 70° C., while cooling, with ammonia or a primary amine with from 1 to 8 C-atoms, preferably the isomeric butyl amines, with the reaction water being removed through azeotropic distillation with an entraining agent. Advantageously, primary amines carrying tertiary amino groups in addition to the primary amine groups can be used. In this way it is possible to introduce protonable groups causing or supporting the water solubility of the system with the aid of the blocking agent. Since these basic groups split off during film baking, the resulting films have no or only a reduced number of remaining amino groups. Suitable primary-tertiary diamines are the dialkylaminoalkylamines such as dimethyl- or diethylaminopropyl amine, and the like.

The preferred polyisocyanates for use in the preparation of the semi-blocked diisocyanates of the present invention are compounds wherein the different isocyanate groups of the compound have a different reactivity. In particular, the available toluylene diisocyanate where about 80% is the 2,4-toluylene diisocyanate isomer or isophorone diisocyanate are preferred. It is evident that for the preparation of the totally blocked polyisocyanate compounds any of the di- or higher isocyanate compounds can be used. Examples for such compounds are known in the art. In the same way, blocked polyisocyanates can be produced through reaction of polyols of diisocyanates semiblocked with the enamines. In the preparation of the semiblocked diisocyanates, the enamine is preferably added to the diisocyanate within from about 30 to 60 minutes at from about 20° to 30° C., while cooling. The temperature is held until the calculated NCO-value is reached. In the preparation of totally blocked polyisocyanates, the joint reaction is preferably carried out at 60° to 80° C.

The resin component suitable for combination with the polyisocyanates semi-blocked or totally blocked with the enamines are all binders water-dilutable on protonation and are known in the art. The primary requirement is a sufficient number of isocyanate-reactive functional groups for crosslinking with or for reaction with the semi-blocked isocyanate compounds. Examples of such resins are the epoxy resin-amine-adducts, optionally modified in a variety of ways, copolymers of ethylenically unsaturated monomers carrying basic groups, modified phenol ethers, and the like. The cationic binders can also be synthesized from polymers through reaction with semiblocked diisocyanates which are blocked with enamines carrying tertiary amino groups to provide water dilutability. In such case, the polymers can be polyesters, polyadducts or copolymers, as long as they carry a sufficient number of isocyanate functional groups, preferably hydroxyl groups.

The formulation, preparation, and processing of paints on the basis of the binders prepared according to the present invention corresponds to the conventional procedures known in the art. The obtained water-dilutable paints can be applied by conventional methods such as spraying, dipping, flow coating, etc. The preferred end use is in CED-coatings. Through the use of the enamine-blocked polyisocyanates according to the present invention, with suitable catalyzation, the stoving temperature can be reduced to from about 130° to 140° C. At such temperatures, with the known prior art curing mechanisms it has not been possible to achieve the resistance characteristics as required in commercial applications.

The following examples illustrate the invention without limiting its scope. Parts and percentages are by weight unless otherwise stated. The following abbreviations are used in the examples:

| ACAC | acetylacetone |
| ACE | ethylacetoacetate |
| ACEA | aceto acetic acid diethylamide |
| AM | ammonia (22–24% aqueous solution) |
| IBA | isobutylamine |
| EHA | 2-ethylhexylamine |
| DMAPA | dimethylaminopropylamine |
| DEAPA | diethylaminopropylamine |
| TDI | toluylenediisocyanate (available 80/20 isomer blend) |
| IPDI | isophoronediisocyanate |
| TMP | trimethylolpropane |
| TOLA | triethanolamine |
| DGM | diethyleneglycoldimethylether |
| EGLAC | monoethyleneglycolmonoethyletheracetate |
| EPH I | epoxy resin based on Bisphenol A and epichlorohydrin (epoxy equivalent weight about 475) |
| EPH II | epoxy resin based on Bisphenol A and epichlorohydrin (epoxy equivalent weight about 190) |
| F 91 | paraformaldehyde, 91% |
| DEA | diethylamine |

I. Preparation Of The Enamines

According to the data listed in Table 1, various enamines of dicarbonyl compounds are prepared. The dicarbonyl compound is charged to a reaction vessel equipped with agitator, thermometer, addition cup, cooler, and reflux condenser. At 50° to 70° C. the amine which can be ammonia is added within 15 to 45 minutes while cooling. Then the reaction water is distilled off at 70° to 120° C. with the aid of an azeotropic solvent, such as an aliphatic hydrocarbon having a boiling range of from about 80° to 120° C.

TABLE 1

| Enamine | Dicarbonyl Compound/ Parts | Amine/Parts | Molecular Weight |
|---|---|---|---|
| E 1 | 100 ACAC | 191 AM | 99 |
| E 2 | 130 ACE | 73 IBA | 185 |
| E 3 | 100 ACAC | 129 EHA | 211 |
| E 4 | 130 ACE | 130 DEAPA | 242 |
| E 5 | 100 ACAC | 102 DMAPA | 184 |
| E 6 | 141 ACEA | 191 AM | 140 |

II. Preparation Of The Blocked Isocyanates

According to the data listed in Table 2, the enamines of Table 1 are used as a blocking agent for a polyisocyanate. In the semi-blocking of a diisocyanate, the isocyanate is charged to a suitable reaction vessel and the enamine is added continuously within 30 to 60 minutes at 20° to 30° C. while cooling. The temperature is held until the isocyanate value calculated for the semiadduct is reached.

In the preparation of a totally blocked polyisocyanate, a semi-blocked diisocyanate is reacted at 60° to 80° C. with the corresponding quantity of a polyol. The same conditions apply to a direct total blocking of a di- or polyisocyanate with an enamine. To facilitate further processing, the products are dissolved in a solvent.

Table 2 is as follows:

TABLE 2

| Blocked IC-Cpd. | Diisocyanate Parts | (Moles) | Enamine Parts | (Moles) | Polyol Parts | (Moles) | Solution % in DGM |
|---|---|---|---|---|---|---|---|
| IC 1 | 174 TDI | (1.0) | 99 E 1 | (1.0) | — | — | 70 |
| IC 2 | 222 IPDI | (1.0) | 185 E 2 | (1.0) | — | — | 70 |
| IC 3 | 435 TDI | (2.5) | 528 E 3 | (2.5) | 134 TMP | (1.0) | 70 |
| IC 4 | 174 TDI | (1.0) | 242 E 4 | (1.0) | — | — | 70 |
| IC 5 | 222 IPDI | (1.0) | 184 E 5 | (1.0) | — | — | 70 |
| IC 6 | 666 IPDI | (3.0) | 420 E 6 | (3.0) | 149 TOLA | (1.0) | 70 |

Preparation of Binders Of Invention

EXAMPLE 1

475 parts EPH I and 66 parts DEA are held at 100° C. for 2 hours in the presence of 232 parts DGM. After addition of 332 parts IC 1, 70% (0.85 moles), the batch is held at 70° C. until an NCO-value of zero is reached.

EXAMPLE 2

228 parts bisphenol A (1 mole) are reacted with 130 parts DEAPA (1.0 moles) and 33 parts F 91 at 90° to 120° C., until 21 parts reaction water have been entrained through azeotropic distillation with the aid of toluol. After addition of 230 parts DGM, 581 parts IC 2, 70%, are added at 40° C. within 20 minutes while cooling. At the end of the addition, all NCO-groups are consumed. 268 parts octadeceneoxide (1 mole) and 190 parts EPH II are added and reacted at 90° to 95° C. for about 3 hours, until all of the epoxy groups are consumed.

EXAMPLE 3

A modified epoxy-amine-adduct, not self-crosslinking, carrying hydroxy groups, is prepared as follows: 500 parts of an epoxy resin based on bisphenol A and epichlorohydrin (epoxy equivalent about 500) are dissolved in 214 parts propylene glycolmonoethylether and reacted at 110° C. with 83 parts of a semiester of phthalic acid anhydride and 2-ethylhexanol in the presence of 0.5 triethylamine as catalyst to an acid value of below 3 mg KOH/g. Then 120 parts of an NH-functional oxazolidine of aminoethylethanolamine, 2-ethylhexylacrylate and formaldehyde and 26 parts diethylaminopropylamine are added and the batch is held at 80° C. to an epoxy value of practically zero. The batch is diluted with 200 parts propyleneglycolmonomethylether. 70 parts of the obtained binder (100% solids) are homogenized with 30 parts IC 3 (100% solids) for 1 hour at 50° C.

EXAMPLE 4

A novolak resin prepared in known manner from 228 parts bisphenol A, 220 parts nonylphenol and 59 parts F 91, etherified with 174 parts propylene oxide is dissolved in 200 parts DGM. The product contains 3 moles aliphatic hydroxyl groups. After addition of 594 parts IC 4, 70%, the reaction is carried at 60° to 70° C. to an NCO-value of zero.

EXAMPLE 5

475 parts EPH I are dissolved in 261 parts DGM and reacted with 134 parts dimethylolpropionic acid, in the presence of 1 part triethylamine as catalyst to an acid value of below 4 mg KOH/g. AT 65° C. 870 parts IC 4, 70%, are added and the temperature is held until an NCO-value of zero is obtained.

EXAMPLE 6

945 parts of a 55% solution in EGLAC of a polyester of 0.5 moles isophthalic acid, 1.0 moles TMP, 0.7 moles adipic acid and 0.7 moles 1,6-hexanediol (acid value below 5 mg KOH/g, hydroxyl value about 280 mg KOH/g) are reacted at 65° to 70° C. with 580 parts IC 5, 70%, until an NCO-value of zero is obtained.

EXAMPLE 7

70 parts (100% solids) of an epoxy resin-amine-adduct, prepared from 475 parts EPH I and 105 parts diethanolamine, 70% in DGM, are homogenized for 1 hour at 50° C. with 30 parts (100% solids) IC 6.

Evaluation Of The Binders According To Examples 1 to 7

Table 3 sets forth the quantity of formic acid necessary for obtaining appropriate dilutability with water and the added quantity of catalyst, percent by weight (b.w) of metal, calculated on resin solids. Column EBT gives the stoving temperature at which, after 20 minutes of stoving time, a film resistant to 200 double rubs with methyl ethylketone is obtained.

TABLE 3

| Example | Millimoles HCOOH/100 g Resin Soilds | % Metal As Catalyst | EBT |
|---|---|---|---|
| 1 | 60 | 0.6 Sn | 140 |
| 2 | 60 | 0.6 Sn | 135 |
| 3 | 40 | 0.8 Sn | 150 |
| 4 | 60 | 0.6 Pb | 150 |
| 5 | 60 | 0.5 Sn | 130 |
| 6 | 70 | 0.6 Pb | 150 |
| 7 | 65 | 0.6 Sn | 140 |

Sn = tin
Pb = lead

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cationic water-dilutable binders comprising blending a resin component carrying functional groups reactive with an isocyanate group with a blocked polyisocyanate compound reactive in the presence of heat with the functional groups of said resin component to provide crosslinking, said blocked polyisocyanate compound being partially or totally blocked with NH-functional enamines obtained by reacting a C-H-active dicarbonyl compound with ammonia or a primary amine, said binder containing groups to render said binder water-dilutable.

2. The process according to claim 1 wherein said polyisocyanate compounds are semi-blocked.

3. The process according to claim 1 wherein said polyisocyanate compounds are totally blocked.

4. The process according to claim 1 wherein the functional groups of said resin component are hydroxyl groups or primary or secondary amino groups or a combination thereof.

5. The process according to claim 1 wherein said resin component is a polycondensation product.

6. The process according to claim 1 wherein the resin component is an addition polymer of ethylenically unsaturated monomers.

7. The process according to claim 1 wherein the C-H-active dicarbonyl compound is acetylacetone, an acetoacetate, or an N-substituted acetoacetic acid amide.

8. The process according to claim 2 wherein the semi-blocking of the isocyanate groups of said polyisocyanate compound with the NH-functional enamines is effected at a temperature between 20° and 30° C.

9. The process according to claim 3 wherein the total blocking of the isocyanate compound groups of said polyisocyanate with the enamines is effected at a temperature between 60° to 80° C.

10. The process according to claim 1 wherein the primary amine is a primary-tertiary amine.

11. The process according to claim 10 wherein said primary-tertiary amine is a dialkylaminoalkylamine.

12. The process according to claim 1 wherein the groups to render said binder water-dilutable are basic groups and said basic groups are introduced into said binder either totally or partially through tertiary amino groups on said semi-blocked diisocyanates.

13. Cationic water-dilutable binders comprising a blend of a resin component carrying functional groups reactive with an isocyanate group and a blocked polyisocyanate compound reactive in the presence of heat with the functional groups of said resin component to provide crosslinking, said blocked polyisocyanate compound being partially or totally blocked with NH-functional enamines obtained by reacting a C-H-active dicarbonyl compound with ammonia or a primary amine, said binder containing groups to render said binder water-dilutable.

14. The binders according to claim 13 wherein said polyisocyanate compounds are semi-blocked.

15. The binders according to claim 13 wherein said polyisocyanate compounds are totally blocked.

16. The binders according to claim 13 wherein the functional groups of said resin component are hydroxyl groups or primary or secondary amino groups or a combination thereof.

17. The binders according to claim 13 wherein said resin component is a polycondensation product.

18. The binders according to claim 13 wherein the resin component is an addition polymer of ethylenically unsaturated monomers.

19. The binders according to claim 13 wherein the C-H-active dicarbonyl compound is acetylacetone, an acetoacetate, or an N-substituted acetoacetic acid amide.

20. The binders according to claim 13 wherein the primary amine is a primary-tertiary amines.

21. The binders according to claim 20 wherein said primary-tertiary amine is a dialkylaminoalkylamine.

22. A paint composition containing the water-dilutable binders of claim 13.

23. A cathodically depositable electrodeposition paint containing the water-dilutable binders of claim 13.

24. The process of claim 1 wherein said resin component is an epoxy resin amine adduct.

25. The binders of claim 13 wherein said resin component is an epoxy resin amine adduct.

* * * * *